C. B. Hutchinson,
Cider Press,
№ 3,926, Reissued Apr. 19, 1870.
Fig. I.
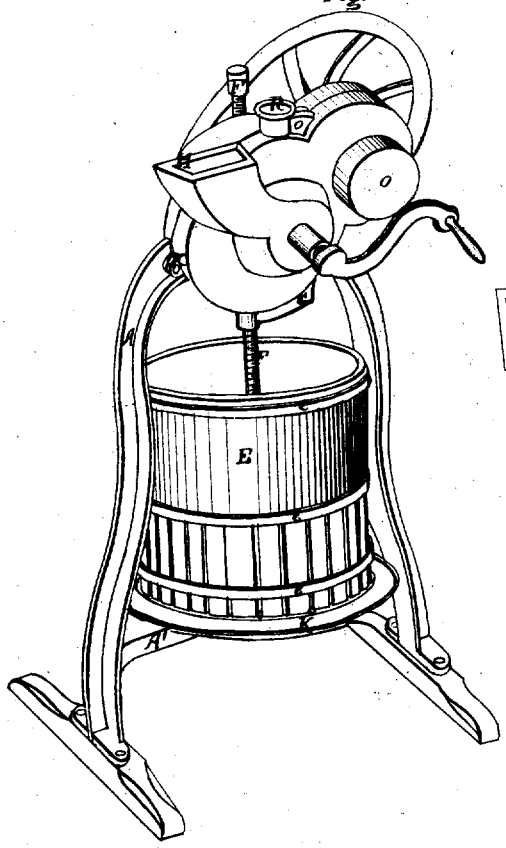
Fig. II.
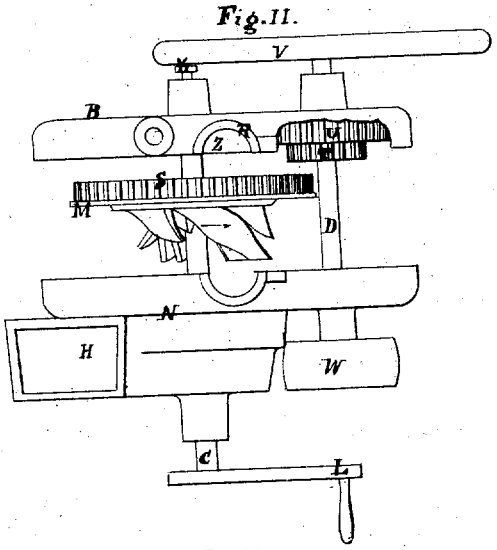
Fig. V.
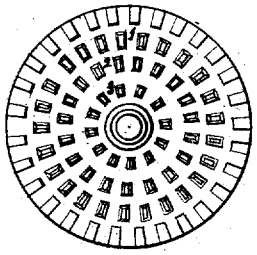
Fig. III.
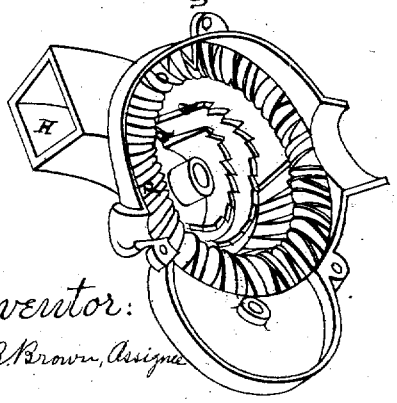
Fig. IV.
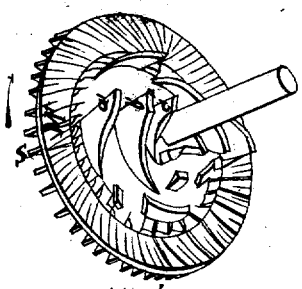
Inventor:
Jas. B. Brown, Assignee
by his attys
H. Clayton & Co.
Witnesses
V. B. Clayton
G. Mathys
N. PETERS, PHOTO-LITHOGRAPHER, WASHINGTON, D. C.

United States Patent Office.

JAMES B. BROWN, OF PEEKSKILL, NEW YORK, ASSIGNEE OF CHARLES B. HUTCHINSON.

*Letters Patent No.* 29,490, *dated August* 7, 1860; *reissue No.* 3,926, *dated April* 19, 1870.

DIVISION B.

IMPROVEMENT IN MILLS.

The Schedule referred to in these Letters Patent and making part of the same.

Be it known that CHARLES B. HUTCHINSON, of Auburn, in the State of New York, made certain new and useful Improvements in Mills for Reducing Apples and other Fruits to Pomace and Pressing the same, and also certain new and useful combinations whereby the same machine can be modified so as to be used for grinding grain, and also as a corn-sheller; and that I, JAMES B. BROWN, the assignee of the entire right of said HUTCHINSON to said invention, do hereby declare that the following is a full, clear, and exact description thereof, reference being had to the accompanying drawings and to the letters of reference thereon marked.

In the drawings—

Figure 1 is a perspective view.

Figure 2 is a view of the top of the machine.

Figures 3 and 4 are "detail views."

Figure 5, plan view of face of wheel M.

The nature of the said HUTCHINSON'S invention, as claimed in this division B, consists chiefly in so constructing and arranging an apparatus for grinding or crushing the fruit in a "cider-mill" as that it may, at will, also serve as an apparatus for grinding grain.

Also, in providing the opposite side of the revolving wheel used to crush or grind the fruit or grain with suitable teeth, usable at will for "shelling" corn.

Also, the construction described, which enables the carrier B to support the working parts of a corn-sheller.

Also, in other hereinafter-described features of novelty.

To enable others to make and use this invention, its construction and operation will be described.

In division A of this specification was described the construction of the apparatus when designed solely for crushing and pressing fruits. In this division B will be described the same apparatus as modified to serve, also at will, for crushing corn and cobs and grinding grain, and also for shelling corn.

The drawing shows the complete apparatus, with all of the modifications. In this division the particular modifications for grinding and shelling corn are more especially described and claimed.

The case marked B is provided with a bearing surface for shaft C.

To this case B is attached the screw F, for pressing the pomace, and below these parts is located a "curb," in which the pomace is pressed. The preferred mode of making this case B is to make it of two pieces, but other modes may be used. This case B may be mounted on any suitable frame or support. I prefer, however, attaching it, by casting or otherwise, directly to the legs of the frame, as shown in fig. 1, and in such a way that it will not only serve as a carrier for a grinding or crushing apparatus and a pressure screw, but also serve as a cross-piece to support the upper part of the frame.

The grinding or crushing apparatus is made as follows:

The disk of the grinding-wheel M′, fig. 4, is provided with projecting teeth *a′ b′ c′*, which are intended to interlock, lap past, and run by or between the projecting or fixed teeth on the case N, shown in fig. 3, letters *a* and *b*. In this figure is shown a space on the case unoccupied by the fixed teeth near the opening H. This is for the purpose of allowing the fruit to be fed freely to the grinding-surfaces. For grinding fruits these projecting teeth on the case or wheel may be somewhat varied without changing the mode of operation. The smaller and the nearer together, the finer they will crush or grind the fruit.

The wheel M′ being suitably actuated, the fruit is fed into the opening H, and, falling into the space on the case unoccupied by the teeth, is caught by the teeth on wheel M′, and is driven forward and crushed or ground against the fixed teeth projecting from the case. The pomace thus made passes out of the opening, and falls into a suitable "curb," where it is duly pressed by means of screw F acting upon a follower moving up and down in the curb. Any suitable "curb" may be used, although the one shown in fig. 1 is preferred.

When this apparatus is to be modified so as to also answer for grinding and shelling grain, it should, in addition to the mode of construction heretofore described, have the peculiar form of teeth shown in fig. 3, *a b*. These hook-shaped teeth are more especially adapted and designed to crush corn-cobs, and, by means of the "mill-dress" shown at the circumference of the wheel M′, fig. 4, if the parts are set closely, they will further grind the crushed cobs or other grain.

In fig. 3 is more particularly shown the shape of the teeth Q *a b*, on that part of the machine when constructed so as to be used as a corn and cob-crusher, as well as for grinding fruit and grain. Near the circumference of this case will be seen another "mill-dress," P, intended to be opposite to and work against or near to the other "mill-dress" on wheel M′.

When the mill is together the teeth *a′ b′ c′*, on wheel M′, travel between the semicircular and jagged-shaped teeth Q *a b* on case N, shown in fig. 3. The faces of these teeth are set obliquely, forming a jagged tooth, short on one side and gradually becoming larger on the other.

When the machine is set in motion these hooked teeth *a′ b′ c′* will grasp ears of corn, or apples, sweeping them along the inclined surfaces of the jagged semicircular teeth Q *a b*, and crush and grind them finer and finer as the teeth of both surfaces interlock deeper and deeper, and they are ground still finer as they pass between the "mill-dress," and are finally discharged at opening G.

Thus it will be seen that this modification or additional feature to the grinding parts enables me to crush corn-cobs and grind grain as well as fruit.

For crushing or grinding fruit only, it is not necessary that this peculiar form of teeth Q *a b* should be used, but, for grinding fruit, and also for crushing cobs and grinding grain, the peculiar formed teeth Q *a b* and "mill-dress" must be used.

It is obvious that this machine can be used as a fruit-grinder only, or as a fruit and grain-grinder, without thereto appending a corn-sheller.

When the machine is to be used also as a corn-sheller, as well as a fruit or grain-grinder, the case B is extended and provided with another bearing for shaft D, shown in figs. 1 and 2, and the wheel M′ is armed with cogs S, and that surface of this wheel is provided with shelling-teeth 1, 2, 3, seen in fig. 5, of the usual form of corn-sheller teeth. When this wheel is brought into place, the cogs S engage with the cogs of wheel T, by which means the beveled wheel U and balance-wheel V are set in motion. The ears of corn are fed into the hopper R, and, being pressed against wheel U by a spring, Z, are caught by the toothed wheels M′ and U, and are carried into the machine and shelled, the cobs and corn passing out of the opening G.

Both the shelling and grinding-surfaces, or either of them, may be adjusted at pleasure by means of the screw Y, fig. 2, bearing against the shaft C, in connection with the screws X. These screws also hold together the two parts of the case B.

Having thus described this invention,

What I claim in this division B as the invention of the said HUTCHINSON is—

1. The peculiar-shaped teeth Q *a b* and *a′ b′ c′* shown on wheel M′ and case N, arranged to operate in connection with each other and with the "mill-dress" M′, as herein shown and described.

2. In combination with the mill herein described, the disk shown in figs. 4 and 5, provided on one face with crushing-teeth *a′ b′ c′* and on the other with shelling-teeth 1, 2, 3, when the mill, the disk, and its teeth are constructed and arranged as and for the purposes herein set forth.

3. The case or carrier B, inclosing disk M′, when provided with the extension herein shown, serving as a support and casing to wheels U and T, all said parts being constructed and arranged as and for the purposes herein shown and set forth.

In testimony whereof, I, the said JAMES B. BROWN, have hereunto set my name.

J. B. BROWN.

Witnesses:
WARREN GALE,
BENJ. BASSETT.